(12) United States Patent
Noh et al.

(10) Patent No.: US 9,859,574 B2
(45) Date of Patent: Jan. 2, 2018

(54) COMPRESSED AIR COOLING APPARATUS OF FUEL CELL SYSTEM

(71) Applicant: Hyundai Motor Company, Seoul (KR)

(72) Inventors: Yong Gyu Noh, Gyeonggi-do (KR); Minkyu Lee, Incheon (KR); Sekwon Jung, Gyunggi-Do (KR)

(73) Assignee: Hyundai Motor Company, Seoul (KR)

( * ) Notice: Subject to any disclaimer, the term of this patent is extended or adjusted under 35 U.S.C. 154(b) by 894 days.

(21) Appl. No.: 14/068,435

(22) Filed: Oct. 31, 2013

(65) Prior Publication Data

US 2014/0138060 A1 May 22, 2014

(30) Foreign Application Priority Data

Nov. 21, 2012 (KR) ........................ 10-2012-0132515

(51) Int. Cl.
| | |
|---|---|
| *F28D 15/06* | (2006.01) |
| *H01M 8/04007* | (2016.01) |
| *H01M 8/04014* | (2016.01) |
| *H01M 8/04089* | (2016.01) |
| *H01M 8/04119* | (2016.01) |

(52) U.S. Cl.
CPC ........ *H01M 8/04074* (2013.01); *F28D 15/06* (2013.01); *H01M 8/04014* (2013.01); *H01M 8/04089* (2013.01); *H01M 8/04141* (2013.01)

(58) Field of Classification Search
CPC ........ H01M 8/04014; H01M 8/04059; H01M 8/04067; H01M 8/04723; F28D 15/025; F28D 5/06

See application file for complete search history.

(56) References Cited

U.S. PATENT DOCUMENTS

| | | | |
|---|---|---|---|
| 5,159,972 A | 11/1992 | Gunnerson et al. | |
| 6,948,556 B1 * | 9/2005 | Anderson | ........... F28D 15/0266 |
| | | | 165/104.26 |
| 2006/0105209 A1 | 5/2006 | Thyroff et al. | |
| 2010/0035095 A1* | 2/2010 | Taniguchi | ......... H01M 8/04007 |
| | | | 429/434 |
| 2010/0300644 A1 | 12/2010 | Chung | |

FOREIGN PATENT DOCUMENTS

| | | |
|---|---|---|
| CN | 101521287 A | 9/2009 |
| JP | 06-159959 | 6/1994 |
| JP | 2000-285947 A | 10/2000 |
| JP | 2005-259402 A | 9/2005 |
| JP | 2006-164738 A | 6/2006 |

(Continued)

*Primary Examiner* — Cassey D Bauer
(74) *Attorney, Agent, or Firm* — Mintz Levin Cohn Ferris Glovsky and Popeo, P.C.; Peter F. Corless

(57) ABSTRACT

A compressed air cooling apparatus of a fuel cell system is provided that includes i) a heat absorber installed at a first part of an air supplying system which supplies compressed air of a first compressed by an air compressor to a fuel cell stack, ii) a heat radiator installed at a second part of a stack cooling system which cools a coolant circulating to the fuel cell stack, iii) a heat pipe which connects the heat absorber and the heat radiator and is filled with the refrigerant therein, wherein the heat absorber is disposed at a lower position than the heat radiator for the refrigerant to flow from the heat radiator to the heat absorber.

8 Claims, 13 Drawing Sheets

(56) References Cited

FOREIGN PATENT DOCUMENTS

| | | |
|---|---|---|
| JP | 2006-526757 A | 11/2006 |
| JP | 2008-021500 A | 1/2008 |
| JP | 2009-170111 A | 7/2009 |
| JP | 2010-249137 A | 11/2010 |
| JP | 2010-277747 A | 12/2010 |
| KR | 10-2005-0045542 | 5/2005 |
| KR | 10-2005-0122769 | 12/2005 |

\* cited by examiner

COMPRESSED AIR COOLING APPARATUS OF FUEL CELL SYSTEM

CROSS-REFERENCE TO RELATED APPLICATION

This application claims priority to and the benefit of Korean Patent Application No. 10-2012-0132515 filed in the Korean Intellectual Property Office on Nov. 21, 2012, the entire contents of which are incorporated herein by reference.

BACKGROUND (a) Field of the Invention

An exemplary embodiment of the present invention relates to a fuel cell system, and more particularly, to a compressed air cooling apparatus capable of cooling compressed air which is supplied to a fuel cell stack through an air compressor.

(b) Description of the Related Art

In general, a fuel cell system supplies hydrogen, which is used as fuel, and air, which is an oxidant, to a fuel cell stack, and electricity is produced by an electrochemical reaction of the hydrogen and the oxygen within the fuel cell stack. When a fuel cell system is mounted in a vehicle, and the vehicle is driven by operating an electric motor with electricity produced by the fuel cell stack.

Typically, a fuel cell system includes a fuel supplying system that supplies fuel to the fuel cell stack, an air supplying system that supplies air to the fuel cell stack, and a cooling system that removes heat produced from the fuel cell stack.

One type of air supplying system is an air compressor that compresses air and supplies the compressed air to the fuel cell stack, and a humidifier humidifies the compressed air with water produced from the fuel cell stack between the air compressor and the fuel cell stack.

However, under a high output power driving conditions of the fuel cell stack, the temperature of the air compressed by the air compressor increases to be about 120° C. due to a high compression ratio and a volume of air.

Since the aforementioned temperature is greater than 60 to 80° C., which is a normal driving temperature of the fuel cell stack, this creates problems in relation to humidification efficiency of the humidifier and driving efficiency of the fuel cell stack. Therefore, the fuel cell system needs to cool this high temperature compressed air which is supplied to the humidifier by the air compressor prior to supplying it to the stack.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a compressed air cooling apparatus for a fuel cell system having advantage of cooling compressed air at a temperature that is higher than a normal operating temperature of the fuel cell, which is supplied from an air compressor to a fuel cell stack, by using a simplified structure.

In addition, the present invention provides a compressed air cooling apparatus of a fuel cell system that actively controls a temperature of compressed air under higher output power driving condition of a fuel cell stack, and improves air cooling performance and efficiency to provide a rapid increase in temperature of the compressed air.

An exemplary embodiment of the present invention provides a compressed air cooling apparatus of a fuel cell system, including: i) a heat absorber installed at a high temperature part of an air supplying system which supplies compressed air of a high temperature compressed (e.g., above about 60° C. to 80° C.) by an air compressor to a fuel cell stack, ii) a heat radiator installed at a low temperature part of a stack cooling system which cools a coolant circulating through the fuel cell stack, iii) a heat pipe which connects the heat absorber and the heat radiator and is filled with the refrigerant therein.

In addition, in the compressed air cooling apparatus of the fuel cell system according to the exemplary embodiment of the present invention, the heat absorber may be disposed at a comparatively lower position than the heat radiator (i.e., below the heat radiator).

Furthermore, the compressed air cooling apparatus of the fuel cell system may include a refrigerant reservoir connected to the heat radiator to store the refrigerant, and a refrigerant supplier which substantially connects the refrigerant reservoir and the heat absorber, and selectively supplies the refrigerant of the refrigerant reservoir to the heat absorber.

In addition, in the compressed air cooling apparatus of the fuel cell system according to the exemplary embodiment of the present invention, the heat absorber may be installed at an air supply line, the air supply line being the high temperature part, which connects the air compressor and a humidifier.

In addition, in the compressed air cooling apparatus of the fuel cell system according to the exemplary embodiment of the present invention, the heat absorber may be provided at a side of a compressed air inlet of the humidifier.

Furthermore, in the compressed air cooling apparatus of the fuel cell system according to the exemplary embodiment of the present invention, the heat radiator may be installed to be adjacent to a cooling fan of a radiator module as the low temperature part.

In some exemplary embodiments, in the compressed air cooling apparatus of the fuel cell system according to the exemplary embodiment of the present invention, the heat radiator may be installed at a stack coolant flow path of a radiator module as the low temperature part.

Further, in the compressed air cooling apparatus of the fuel cell system according to the exemplary embodiment of the present invention, the refrigerant supplier may include a refrigerant supply line which connects the refrigerant reservoir and the heat absorber, and a refrigerant pumping device may be installed within the refrigerant supply line.

In addition, in the compressed air cooling apparatus of the fuel cell system according to the exemplary embodiment of the present invention, the refrigerant supplier may include a refrigerant supply line which connects the refrigerant reservoir and the heat absorber, and a flow path opening and closing device may be installed as well within the refrigerant supply line.

In some exemplar embodiments of the present invention, in the compressed air cooling apparatus of the fuel cell system according to the exemplary embodiment of the present invention, the refrigerant supplier may include a refrigerant supply line which connects the refrigerant reservoir and the heat pipe, and a refrigerant pumping device may be installed within the refrigerant supply line.

In addition, in the compressed air cooling apparatus of the fuel cell system according to the exemplary embodiment of the present invention, the refrigerant supplier may include a refrigerant supply line which connects the refrigerant reservoir and the heat pipe, and a flow path opening and closing device may be installed within the refrigerant supply line.

Additionally, the compressed air cooling apparatus of the fuel cell system according to the exemplary embodiment of the present invention may further include a temperature sensor installed at the heat absorber to detect the temperature of the compressed air and output a detection signal to a controller which is monitoring the temperature. The controller may apply a control signal to the refrigerant supplier in accordance with the detection signal of the temperature sensor.

Further, another exemplary embodiment of the present invention provides a compressed air cooling apparatus of a fuel cell system, including i) a heat absorber installed at a high temperature part of an air supplying system which supplies compressed air at a high temperature (e.g., above about 60° C. to 80° C.) compressed by an air compressor to a fuel cell stack, ii) a heat radiator installed at a low temperature part of a stack cooling system which cools a coolant circulating through the fuel cell stack, iii) a heat pipe which connects the heat absorber and the heat radiator and is filled with the refrigerant therein; and iv) a pressure applicator which connects the high temperature part and the heat pipe, and applies pressure to refrigerant gas evaporated inside the heat pipe.

In addition, in the compressed air cooling apparatus of the fuel cell system according to the exemplary embodiment of the present invention, the heat absorber may be installed within an air supply line which acts as the high temperature part, and connects the air compressor and a humidifier, and the pressure applicator may be connected to the air supply line and the heat pipe accordingly.

Furthermore, in the compressed air cooling apparatus of the fuel cell system according to the exemplary embodiment of the present invention, the pressure applicator may include an air flow path connected to the air supply line, a cylinder member connected to the air flow path and having a piston, a connecting rod connected to the piston of the cylinder member, a bellows pipe connected to the connecting rod, and a refrigerant gas flow path which connects the bellows pipe and the heat pipe. The bellows pipe may be compressed by the piston, and may press the refrigerant gas inside the heat pipe through the refrigerant gas flow path.

Further, yet another exemplary embodiment of the present invention provides a compressed air cooling apparatus of a fuel cell system, including i) a heat absorber installed at a high temperature part of an air supplying system which supplies compressed air at a high temperature (e.g., above about 60° C. to 80° C.) compressed by an air compressor to a fuel cell stack, ii) a heat radiator installed at a low temperature part of a stack cooling system which cools a coolant circulating to the fuel cell stack, iii) a heat pipe which connects the heat absorber and the heat radiator and is filled with the refrigerant therein, and iv) a pressure applicator which connects the high temperature part, the heat radiator, and the heat pipe, and applies pressure to a liquid refrigerant inside the heat pipe.

In addition, in the compressed air cooling apparatus of the fuel cell system according to the exemplary embodiment of the present invention, the heat absorber may be installed within an air supply line which is acting as the high temperature part, and connects the air compressor with a humidifier, and the pressure applicator may be connected to the air supply line, the heat radiator, and the heat pipe.

Furthermore, in the compressed air cooling apparatus of the fuel cell system according to the exemplary embodiment of the present invention, the pressure applicator may include an air flow path connected to the air supply line, a cylinder member connected to the air flow path and having a piston, a connecting rod connected to the piston of the cylinder member, a bellows pipe connected to the connecting rod, a first refrigerant liquid flow path which connects the bellows pipe and the heat radiator, and a second refrigerant liquid flow path which connects the bellows pipe and the heat pipe. The bellows pipe may be supplied with the liquid refrigerant of the heat radiator through the first refrigerant liquid flow path. This bellows pipe may be compressed by the piston, and may supply the liquid refrigerant into the heat pipe through the second refrigerant liquid flow path.

According to the exemplary embodiments of the present invention, because the compressed air at a high temperature (e.g., above about 60° C. to 80° C.), which is supplied from the air compressor to the fuel cell stack, may be cooled by a simplified structure of the heat pipe which connects the heat absorber and the heat radiator, an excessive increase in temperature of the compressed air may be suppressed. Therefore, in the exemplary embodiments of the present invention, damage to the fuel cell stack due to heat of the compressed air may be prevented, and a temperature condition of the compressed air, which is appropriate for normally driving the fuel cell stack, may be satisfied.

In addition, in the exemplary embodiments of the present invention, because the compressed air of a high temperature may be prevented from being supplied to the humidifier, deterioration in humidifying efficiency of the humidifier and driving performance of the fuel cell stack may be prevented.

Moreover, in the exemplary embodiments of the present invention, because the compressed air at a high temperature may be cooled via a simplified structure of the heat pipe which connects the heat absorber and the heat radiator, the fuel cell system may be efficiently implemented in a reduced package.

Further, in the exemplary embodiments of the present invention, a temperature of the compressed air at the high temperature part may be controlled by adjusting an amount of the refrigerant, which is supplied from the heat radiator to the heat absorber, through the refrigerant supplier in accordance with a temperature of the compressed air, which is detected by the temperature sensor. Therefore, in the exemplary embodiments of the present invention, a temperature of the compressed air may be actively controlled under a high output power driving condition of the fuel cell stack, and air cooling performance may be improved by fast responsiveness to a rapid increase in temperature of the compressed air.

Meanwhile, in the exemplary embodiments of the present invention, because pressure of the compressed air is applied to the refrigerant gas evaporated inside the heat pipe through the pressure applicator during a process of cooling the compressed air, the movement of the refrigerant gas inside the heat pipe may be activated.

In addition, in the exemplary embodiments of the present invention, because the liquid refrigerant is supplied into the heat pipe through the pressure applicator by using pressure of the compressed air thereby pressing the liquid refrigerant inside the heat pipe during a process of cooling the compressed air, the movement of the liquid refrigerant inside the heat pipe may be accelerated. Therefore, in the exemplary embodiments of the present invention, the circulation of the refrigerant of the heat pipe is activated by using pressure of compressed air which flows through the air supply line, and thereby the cooling performance of the compressed air may be improved without using additional electrical control means.

BRIEF DESCRIPTION OF THE DRAWINGS

The drawings are provided for reference to explain an illustrative exemplary embodiment of the present invention, and the technical spirit of the present invention should not be interpreted to be limited to the accompanying drawings.

DETAILED DESCRIPTION OF THE EMBODIMENTS

Figure 1:
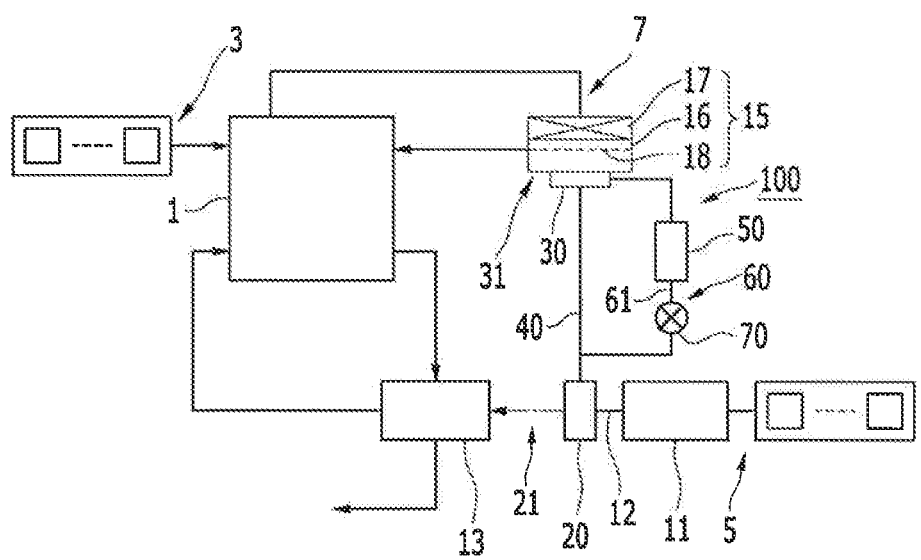
FIG. 1 is a block diagram schematically illustrating a fuel cell system to which a first exemplary embodiment of the present invention is applied.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

To clearly describe the present invention, parts that are irrelevant to the description are omitted. Like numerals refer to like or similar constituent elements throughout the specification.

The size and the thickness of each component illustrated in the drawings are arbitrarily illustrated in the drawings for better understanding and ease of description, but the present invention is not limited to the illustration. In the drawings, the thicknesses of various portions and regions are enlarged for clarity.

Further, in the following detailed description, names of constituents, which are in the same relationship, are divided into "the first", "the second", and the like, but the present invention is not limited to the order in the following description.

In the specification, unless explicitly described to the contrary, the word "comprise" and variations such as "comprises" or "comprising", will be understood to imply the inclusion of stated elements but not the exclusion of any other elements.

In addition, the terminology such as " . . . unit", " . . . means", " . . . part", or " . . . member", which is disclosed in the specification, refers to a unit of an inclusive constituent which performs at least one of the functions or operations.

FIG. 1 is a block diagram schematically illustrating a fuel cell system to which a first exemplary embodiment of the present invention is applied. Referring to FIG. 1, a compressed air cooling apparatus 100 according to a first exemplary embodiment of the present invention may be applied to a fuel cell system 101 which produces electrical energy by an electrochemical reaction between fuel and an oxidant.

For example, the fuel cell system may be applied to a fuel cell vehicle which drives an electric motor with electrical energy produced by an electrochemical reaction between fuel and an oxidant. The fuel cell system 101 includes a fuel cell stack 1, a fuel supplying system 3 that supplies hydrogen gas as fuel to the fuel cell stack 1, an air supplying system 5 that supplies air as an oxidant to the fuel cell stack 1, and a cooling system 7 that cools heat generated from the fuel cell stack 1.

Among the aforementioned constituents, the air supplying system 5 includes an air compressor 11 that compresses air and supplies the compressed air to the fuel cell stack 1, and a humidifier 13 installed between the air compressor 11 and the fuel cell stack 1.

The air compressor 11 supplies the compressed air at a comparatively high temperature (e.g., approximately, 120° C.) to the humidifier 13 through an air supply line 12 during high output power driving conditions of the fuel cell stack 1. The humidifier 13 then humidifies the compressed air with water generated from the fuel cell stack 1, and supplies the humidified air to the fuel cell stack 1.

Further, the cooling system 7 includes a radiator module 15 that cools a coolant which is heated while circulating in the fuel cell stack 1. A radiator 16 and a cooling fan 17 are provided at the radiator module 15, and a coolant flow path 18 is provided at the radiator 16.

The compressed air cooling apparatus 100 according to an exemplary embodiment of the present invention is provided at the fuel cell system 101 configured as described above in order to cool the compressed air at a high temperature, which is supplied from the air compressor 11 to the humidifier 13 through the air supply line 12.

The compressed air cooling apparatus 100 of the fuel cell system according to the exemplary embodiment of the present invention having a structure capable of cooling the compressed air at a high temperature, which is supplied from the air compressor 11 to the fuel cell stack 1 through the humidifier 13, by adapting a configuration of a heat pipe.

In addition, the exemplary embodiment of the present invention provides the compressed air cooling apparatus 100 of the fuel cell system, capable of actively controlling a temperature of the compressed air under a high output power driving condition of the fuel cell stack 1, and improving air cooling performance with fast responsiveness to a rapid increase in temperature of the compressed air.

Figure 2:
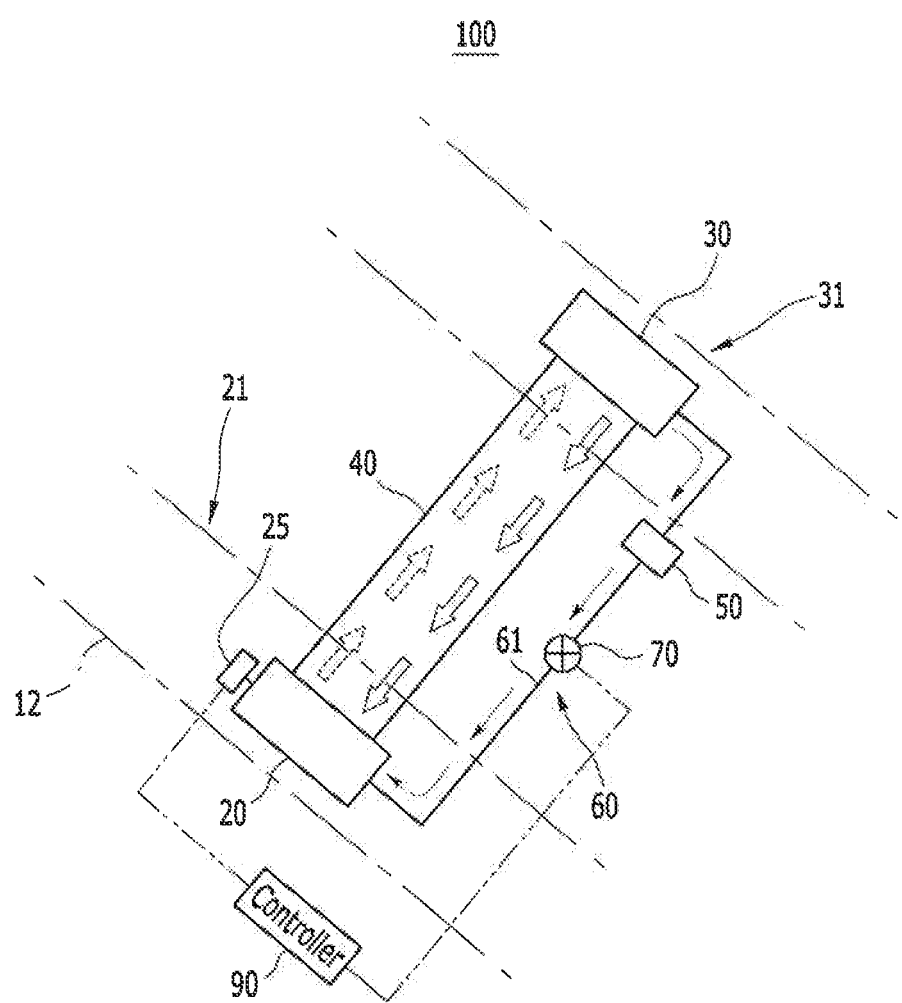
FIG. 2 is a view schematically illustrating a compressed air cooling apparatus of the fuel cell system according to the first exemplary embodiment of the present invention.

FIG. 2 is a view schematically illustrating a compressed air cooling apparatus of a fuel cell system according to a first exemplary embodiment of the present invention. Referring to FIGS. 1 and 2, the compressed air cooling apparatus 100 of the fuel cell system according to the first exemplary embodiment of the present invention basically includes a heat absorber 20, a heat radiator 30, a heat pipe 40, a refrigerant reservoir 50, and a refrigerant supplier 60, but it should be understood that the scope of the present invention is not limited thereto.

Other configurations, for example, a configuration in which refrigerant may flow from the heat radiator 30 to the heat absorber 20 without the refrigerant reservoir 50 and the refrigerant supplier 60, may be used in the exemplary embodiment of the present invention.

The heat absorber 20 may be installed at a high temperature part (i.e., first part) 21 of the air supplying system 5 which supplies the compressed air at a high temperature (e.g., above about 60° C. to 80° C.), which is compressed by the air compressor 11 at the fuel cell system 101, to the fuel cell stack 1. The heat absorber 20 serves to evaporate a refrigerant inside the heat pipe 40, which will be describe in more detail, with heat of the high temperature part 21.

Figure 3:
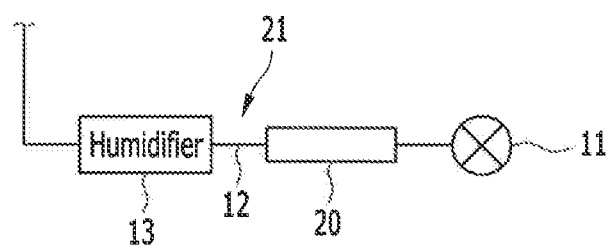
FIG. 3 is a view schematically illustrating a first mounting example of a heat absorber which is applied to the compressed air cooling apparatus of the fuel cell system according to the first exemplary embodiment of the present invention.
Figure 4:
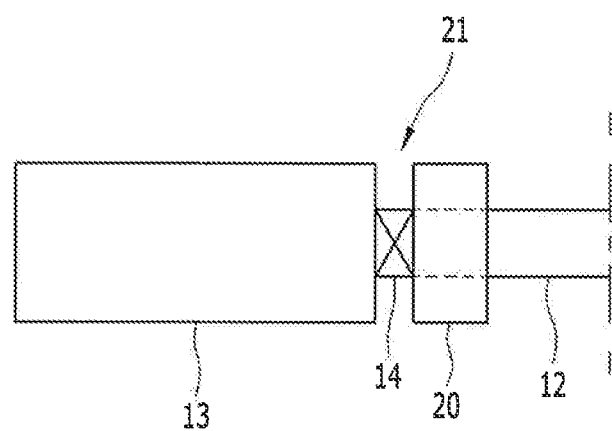
FIG. 4 is a view schematically illustrating a second mounting example of the heat absorber which is applied to the compressed air cooling apparatus of the fuel cell system according to the first exemplary embodiment of the present invention.

Here, the high temperature part 21 may be defined as the air supply line 12 through which the compressed air at a high temperature is supplied to the humidifier 13. That is, as illustrated in FIG. 3, the heat absorber 20 may be installed at the air supply line 12 which connects the air compressor 11 and the humidifier 13. In this case, as illustrated in FIG. 4, the heat absorber 20 is provided on a compressed air inlet 14 side of the humidifier 13, and the humidifier 13 and the heat absorber 20 may be formed as a single module.

Meanwhile, a temperature sensor 25, which detects a temperature of the compressed air and outputs a detection signal to a controller 90, is installed at the heat absorber 20. Because the temperature sensor 25 is a publicly known technology widely known in this field, a more detailed description of how a temperature sensor works and operates will be omitted in the present specification.

The heat radiator 30, on the other hand, may be installed at a low temperature part 31 (i.e., second part) of the cooling system 7 which cools the coolant circulating from the fuel cell system 101 to the fuel cell stack 1. The heat radiator 30 discharges latent heat while condensing refrigerant gas evaporated in the heat absorber 20, and accommodates the refrigerant condensed to a liquid state. Here, the low temperature part 31 may be defined as a portion of the radiator module 15 which cools the coolant which is heated while circulating from the fuel cell system 101 to the fuel cell stack 1.

Figure 5:
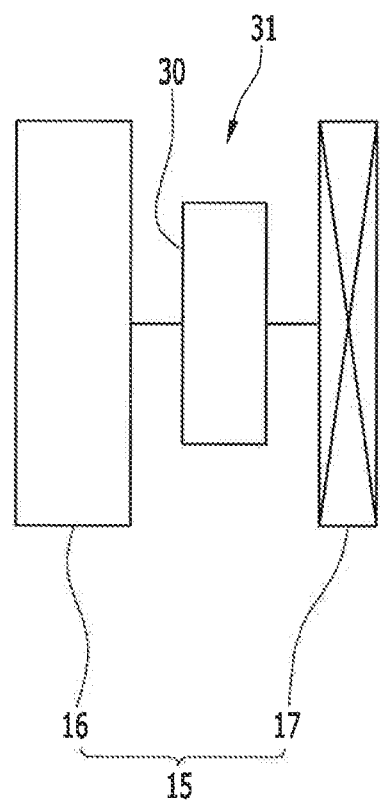
FIG. 5 is a view schematically illustrating a first mounting example of a heat radiator which is applied to the compressed air cooling apparatus of the fuel cell system according to the first exemplary embodiment of the present invention.
Figure 6:
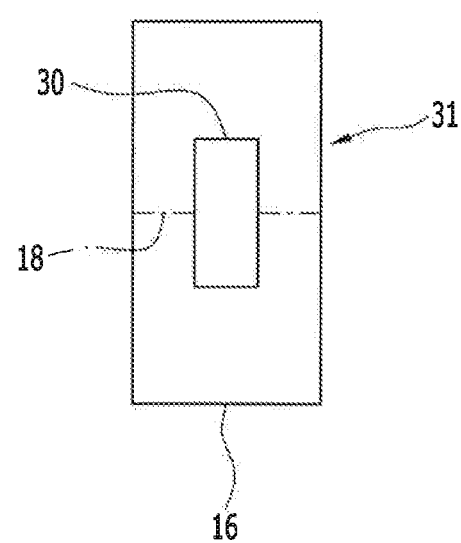
FIG. 6 is a view schematically illustrating a second mounting example of the heat radiator which is applied to the compressed air cooling apparatus of the fuel cell system according to the first exemplary embodiment of the present invention.

As illustrated in FIG. 5, the heat radiator 30 may be installed adjacent to the cooling fan 17 between the radiator 16 and the cooling fan 17 of the radiator module 15. Alternatively, as illustrated in FIG. 6, the heat radiator 30 may be installed at the coolant flow path 18 of the radiator 16.

Regarding the heat absorber 20 and the heat radiator 30, the heat absorber 20 may be disposed at a comparatively lower position (i.e., below) than the heat radiator 30. The object of the aforementioned position difference is to move the liquid refrigerant accommodated in the heat radiator 30 to the heat absorber 20 through the heat pipe 40, which will be described below, by using gravity.

Referring to FIGS. 1 and 2, the heat pipe 40 is a pipe connecting the heat absorber 20 and the heat radiator 30, and is filled with the refrigerant as a working liquid therein. The heat pipe 40 refers to a heat transfer apparatus which transmits heat from a portion having high heat generation density to a portion having low heat generation density by using latent heat generated at the time of phase transition of the refrigerant which is evaporated in the heat absorber 20 of the high temperature part 21 and condensed in the heat radiator 30 of the low temperature part 31.

The heat pipe 40 includes a hermetic container having a pipe shape having thermal conductivity, a wick (not illustrated in the drawing) formed in the hermetic container, and a refrigerant filled in the hermetic container. Therefore, because the heat absorber 20 and the heat radiator 30 are connected by the heat pipe 40, the refrigerant is moved from the heat radiator 30 positioned at a higher position than the heat absorber 20 positioned at a lower position through the heat pipe 40.

Accordingly, the heat absorber 20 evaporates the refrigerant with heat of the high temperature part 21, the evaporated refrigerant gas is moved toward the heat radiator 30 of the low temperature part 31 through the heat pipe 40, the heat radiator 30 discharges latent heat while condensing the refrigerant gas to a liquid state, and the liquid refrigerant condensed in the heat radiator 30 is moved again toward the heat absorber 20 through the heat pipe 40. Through this principle, because the heat generated at the high temperature part 21 is transmitted to the low temperature part 31 and discharged to the outside accordingly, the high temperature compressed air at the high temperature part 21 may be cooled to a predetermined temperature in an exemplary embodiment of the present invention.

Referring to FIGS. 1 and 2, the refrigerant reservoir 50 is connected to the heat radiator 30, and temporarily stores the refrigerant condensed in the heat radiator 30. The refrigerant reservoir 50 may be directly connected to the heat radiator 30, or may be connected via an additional line in a more indirect manner.

The refrigerant supplier 60 may also be provided to adjust an amount of refrigerant which is supplied from the heat radiator 30 to the heat absorber 20, and control a temperature of the compressed air at the high temperature part 21. The refrigerant supplier 60 substantially connects the refrigerant reservoir 50 and the heat absorber 20, and may selectively supply the refrigerant in the refrigerant reservoir 50 to the heat absorber 20.

The refrigerant supplier 60 includes a refrigerant supply line 61 for connecting the refrigerant reservoir 50 and the heat absorber 20, and an operating means 70 may be installed within the refrigerant supply line 61. Here, the operating means 70 pumps the refrigerant stored in the refrigerant reservoir 50 toward the heat absorber 20, or supplies the refrigerant stored in the refrigerant reservoir 50 to the heat absorber 20 through the refrigerant supply line 61 by opening a flow path of the refrigerant supply line 61 and using gravity.

Figure 7:
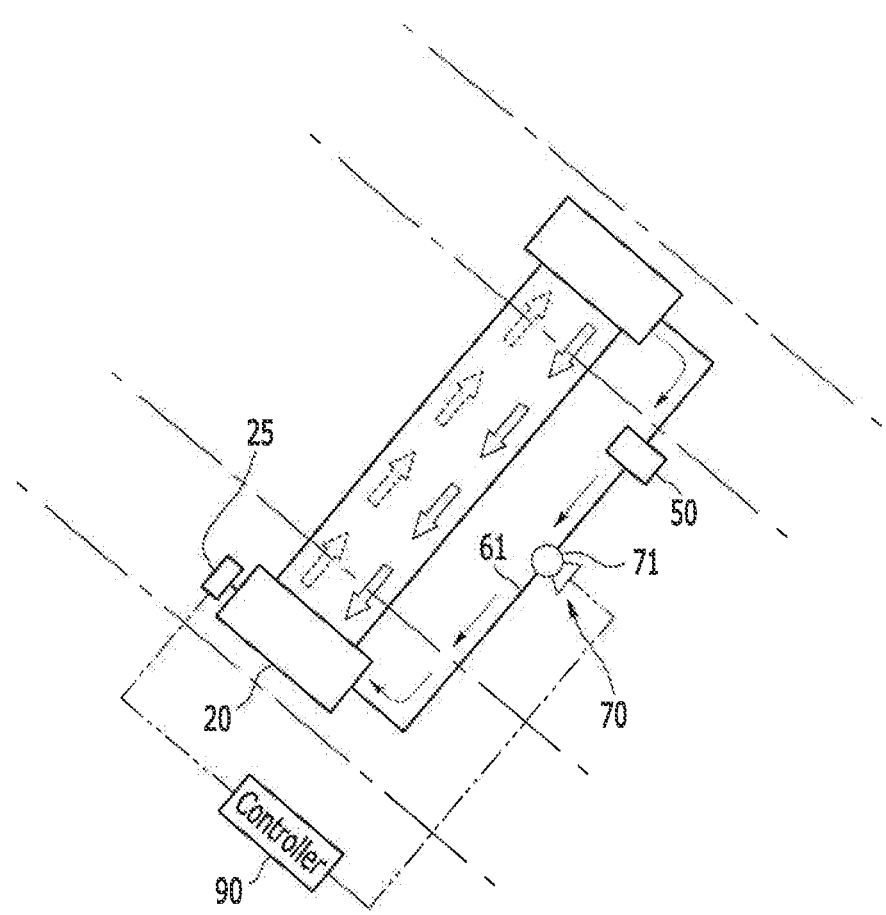
FIG. 7 is a view schematically illustrating a first mounting example of a refrigerant supplier which is applied to the compressed air cooling apparatus of the fuel cell system according to the first exemplary embodiment of the present invention.

As illustrated in FIG. 7, the operating means 70 may include a refrigerant pumping device 71 installed at the refrigerant supply line 61 to pump the refrigerant stored in the refrigerant reservoir 50 toward the heat absorber 20. An example of the refrigerant pumping device 71 may be a pump.

Figure 8:
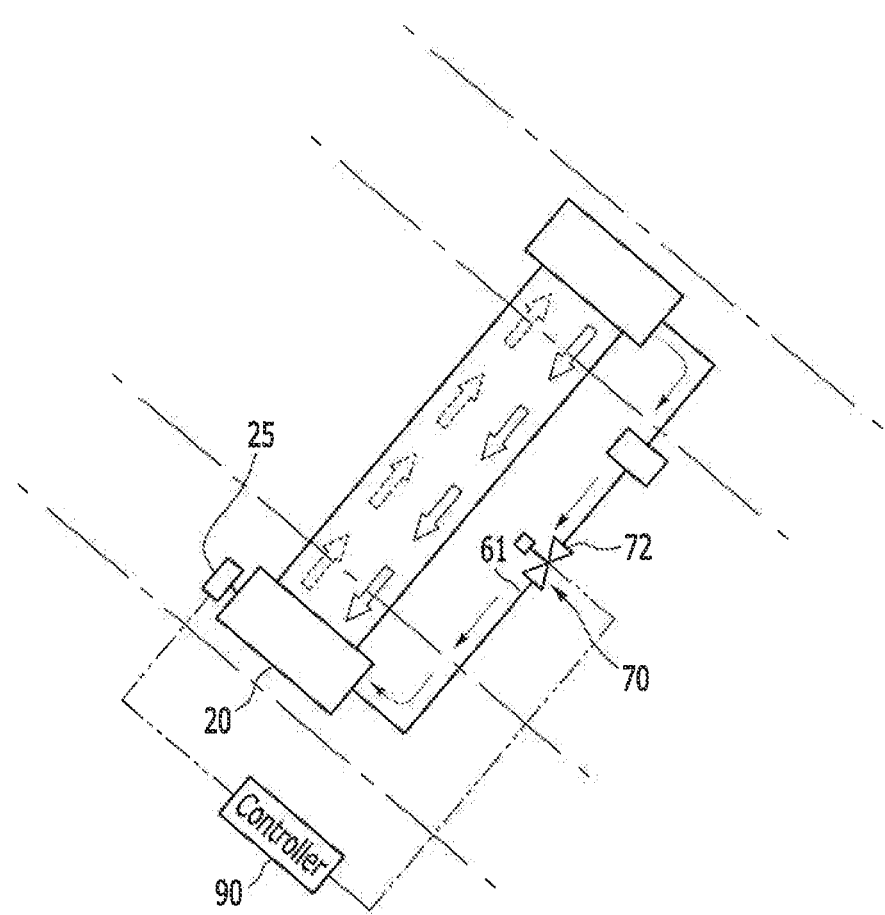
FIG. 8 is a view schematically illustrating a second mounting example of the refrigerant supplier which is applied to the compressed air cooling apparatus of the fuel cell system according to the first exemplary embodiment of the present invention.

Further, as illustrated in FIG. 8, the operating means 70 may include a flow path opening and closing device 72 for selectively opening and closing the flow path of the refrigerant supply line 61. An example of the flow path opening and closing device 72 may be a solenoid valve as an actuator. That is, the flow path opening and closing device 72 may be configured to open the refrigerant supply line 61 to allow the refrigerant stored in the refrigerant reservoir 50 to be supplied to the heat absorber 20 by gravity.

The operating means 70 may be operated by receiving an electrical control signal from the controller 90 in accordance with the detection signal of the aforementioned temperature sensor 25, that is, a temperature of the compressed air detected by the temperature sensor 25.

Alternatively, in an exemplary embodiment of the present invention, the operating means 70 may include a piston-cylinder driven by an actuator, a general valve, or the like as long as it is capable of controlling the flow of the refrigerant.

Hereinafter, an operation of the compressed air cooling apparatus 100 of the fuel cell system according to the first exemplary embodiment of the present invention, which is configured as described above, will be described in detail with reference to FIGS. 1 and 2. First, in an exemplary embodiment of the present invention, at the time of driving the fuel cell system 101, hydrogen gas as fuel is supplied to the fuel cell stack 1 through the fuel supplying system 3, and compressed air as an oxidant is supplied to the fuel cell stack 1 through the air compressor 11 of the air supplying system 5. Here, the compressed air generated by the air compressor 11 is supplied to the humidifier 13 through the air supply line 12, and the humidifier 13 humidifies the compressed air with water generated in the fuel cell stack 1 and supplies the humidified air to the fuel cell stack 1.

The fuel cell, stack 1 generates electrical energy through an electrochemical reaction between hydrogen and oxygen, and generates water and heat as by-products during the reaction. Accordingly, the cooling system 7 of the fuel cell system 101 circulates the coolant to the fuel cell stack 1 to cool heat generated in the fuel cell stack 1. Further, the coolant, which is heated while circulating in the fuel cell stack 1, is supplied to the radiator module 15, and may be supplied again to the fuel cell stack 1 in a state of being cooled by the radiator module 15. Meanwhile, the air compressor 11 supplies the compressed air of a comparatively high temperature (approximately 120° C.) to the humidifier 13 through the air supply line 12 under a high output power driving condition of the fuel cell stack 1.

While the aforementioned processes are performed, the refrigerant is evaporated by heat of the high temperature part 21 of the air supplying system 5 through which the compressed air at a high temperature passes, that is, heat of the high temperature part 21 of the heat absorber 20 installed at the air supply line 12.

Then, the refrigerant gas evaporated in the heat absorber 20 is moved toward the low temperature part, that is, toward the heat radiator 30 on the radiator module 15 side of the cooling system 7 through the heat pipe 40. Accordingly, the heat radiator 30 discharges latent heat while condensing the refrigerant gas to a liquid state, and the liquid refrigerant condensed in the heat radiator 30 is again moved toward the heat absorber 20 through the heat pipe 40. The movement of the liquid refrigerant in the heat radiator 30 to the heat absorber 20 through the heat pipe 40 is possible due to the heat radiator 30 being disposed at a higher position than the heat absorber 20.

Therefore, in the exemplary embodiment of the present invention, while the aforementioned processes are performed, the heat generated from the high temperature part 21 is transmitted to the low temperature part 31 to be discharged to the outside, thereby cooling the high temperature compressed air at the high temperature part 21 to a predetermined temperature, for example, between 60 to 80° C., which is a normal driving temperature of the fuel cell stack 1.

Accordingly, in the exemplary embodiment of the present invention, an excessive increase in temperature of the compressed air, which is supplied from the air compressor 11 to the fuel cell stack 1, is suppressed, thereby satisfying a temperature condition of the compressed air, which protects fuel cells of the fuel cell stack 1 and is appropriate to a normal drive of the fuel cell stack 1.

In addition, in the exemplary embodiment of the present invention, because the compressed air at a high temperature may be prevented from being supplied to the humidifier 13, deterioration in humidifying efficiency of the humidifier 13 and driving performance of the fuel cell stack 1 may be prevented. Moreover, in the exemplary embodiment of the present invention, because the compressed air of a high temperature may be cooled by a simple structure of the heat pipe 40 which connects the heat absorber 20 and the heat radiator 30, a package of the fuel cell system 101 may be implemented in a more compact manner.

Additionally, during the aforementioned process, the temperature sensor 25 may detect a temperature of the compressed air and output the detection signal to the controller 90. Then, the controller 90 applies an electrical signal to the operating means 70 of the refrigerant supplier 60 according to the exemplary embodiment of the present invention when a temperature of the compressed air is determined as equal to or greater than a predetermined temperature in accordance with the detection signal of the temperature sensor 25.

Accordingly, in the exemplary embodiment of the present invention, the refrigerant pumping device 71 (see FIG. 7) or the flow path opening and closing device 72 (see FIG. 8) is operated as the operating means 70 so as to pump the refrigerant stored in the refrigerant reservoir 50 to the heat absorber 20 or supply the refrigerant stored in the refrigerant reservoir 50 to the heat absorber 20 through the refrigerant supply line 61 by opening a flow path of the refrigerant supply line 61.

Therefore, in the exemplary embodiment of the present invention, a temperature of the compressed air at the high temperature part 21 may be controlled by adjusting an amount of refrigerant, which is supplied from the heat radiator 30 to the heat absorber 20, through the refrigerant supplier 60 in accordance with a temperature of the compressed air, which is detected by the temperature sensor 25.

Accordingly, in the exemplary embodiment of the present invention, a temperature of the compressed air may be actively controlled under a high output power driving condition of the fuel cell stack 1, and air cooling performance may be improved by quickly responding a rapid increase in temperature of the compressed air.

Figure 9:
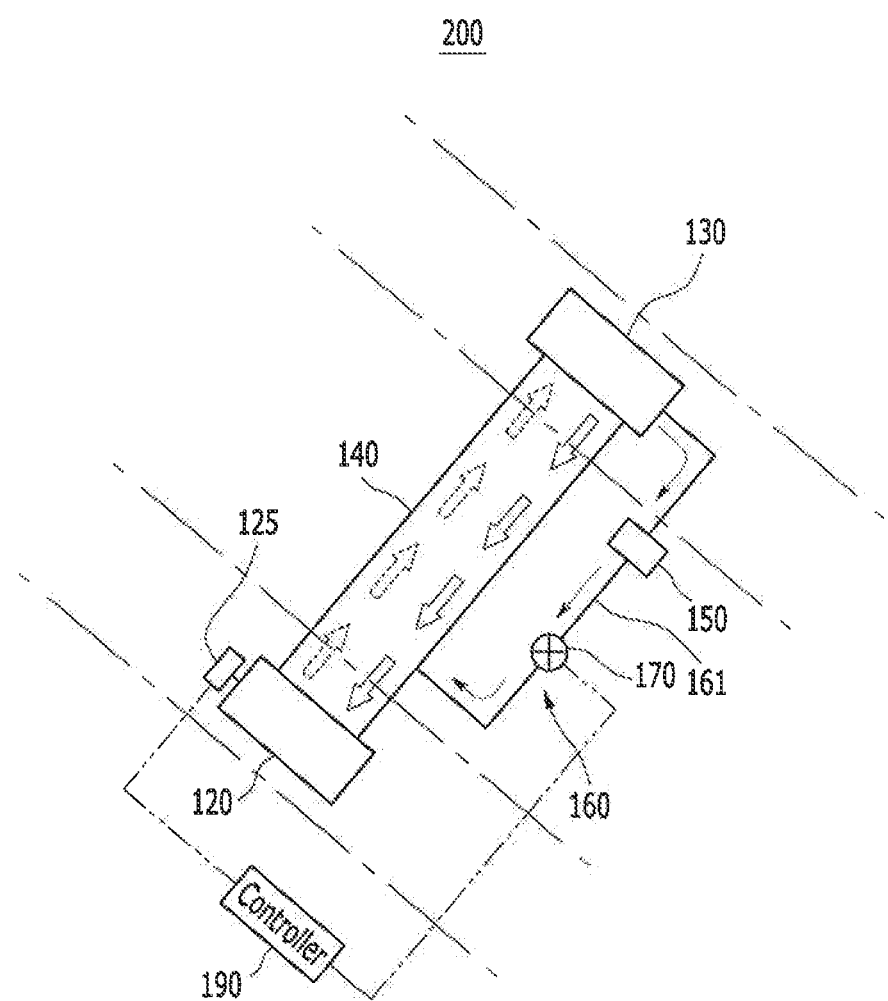
FIG. 9 is a view schematically illustrating a compressed air cooling apparatus of a fuel cell system according to a second exemplary embodiment of the present invention.

FIG. 9 is a view schematically illustrating a compressed air cooling apparatus of a fuel cell system according to a second exemplary embodiment of the present invention. Referring to FIG. 9, a compressed air cooling apparatus 200 of a fuel cell system according to a second exemplary embodiment of the present invention basically includes a heat absorber 120, a heat radiator 130, and a heat pipe 140 like the aforementioned exemplary embodiment, and may include a refrigerant supplier 160 for selectively supplying a refrigerant stored in a refrigerant reservoir 150 to the heat pipe 140.

The refrigerant supplier 160 includes a refrigerant supply line 161 for connecting the refrigerant reservoir 150 and the heat pipe 140, and an operating means 170 installed at the refrigerant supply line 161.

Here, the operating means 170 is provided to pump the refrigerant stored in the refrigerant reservoir 150 to the heat pipe 140, or supply the refrigerant stored in the refrigerant reservoir 150 to the heat pipe 140 through the refrigerant supply line 161 by opening a flow path of the refrigerant supply line 161 and using gravity.

Figure 10:
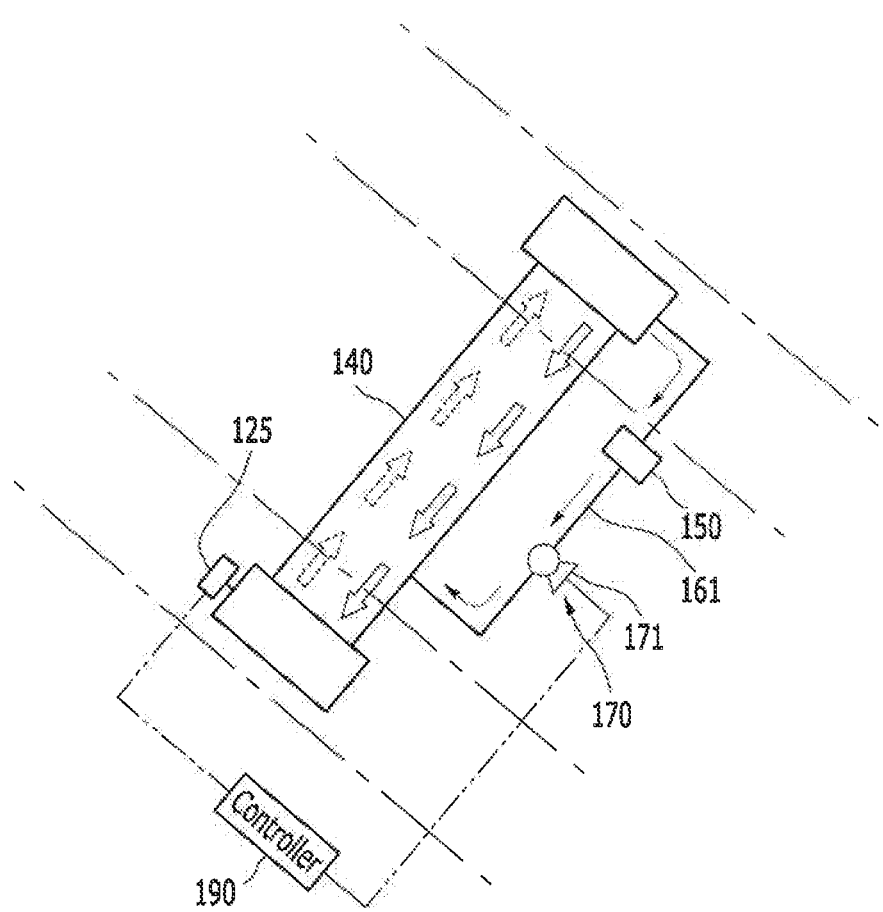
FIG. 10 is a view schematically illustrating a first mounting example of a refrigerant supplier which is applied to the compressed air cooling apparatus of the fuel cell system according to the second exemplary embodiment of the present invention.

As illustrated in FIG. 10, the operating means 170 may include a refrigerant pumping device 171 installed within the refrigerant supply line 161 to pump the refrigerant stored in the refrigerant reservoir 150 to the heat pipe 140. An example of the refrigerant pumping device 171 may be a pump.

Figure 11:
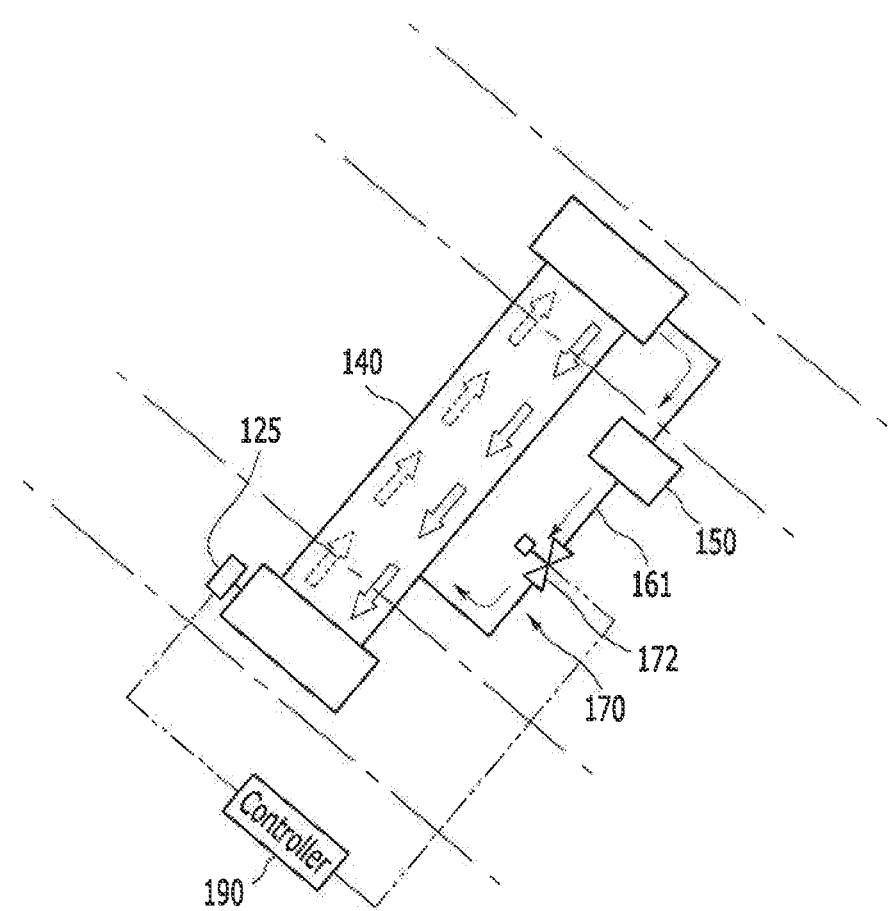
FIG. 11 is a view schematically illustrating a second mounting example of the refrigerant supplier which is applied to the compressed air cooling apparatus of the fuel cell system according to the second exemplary embodiment of the present invention.

Further, as illustrated in FIG. 11, the operating means 170 may include a flow path opening and closing device 172 for selectively opening and closing the flow path of the refrigerant supply line 161. An example of the flow path opening and closing device 172 may be a solenoid valve. That is, the flow path opening and closing device 172 opens the refrigerant supply line 161 to allow the refrigerant stored in the refrigerant reservoir 150 to be supplied to the heat pipe 140 by gravity.

The operating means 170 may be operated by receiving an electrical control signal from a controller 190 in accordance with a detection signal of a temperature sensor 125, that is, a temperature of the compressed air detected by the temperature sensor 125.

Therefore, in the exemplary embodiment of the present invention, when a temperature of the compressed air is detected by the temperature sensor 125, and the detected temperature of the compressed air is determined to be equal to or greater than a predetermined temperature by a controller 190, an electrical signal is applied to the operating means 170 of the refrigerant supplier 160.

Accordingly, in the exemplary embodiment of the present invention, the refrigerant pumping device 171 or the flow path opening and closing device 172 is operated as the operating means 170 in order to pump the refrigerant stored in the refrigerant reservoir 150 to the heat pipe 140 or supply the refrigerant stored in the refrigerant reservoir 150 to the heat pipe 140 through the refrigerant supply line 161 by opening a flow path of the refrigerant supply line 161.

Because the remaining configuration and operational effect of the compressed air cooling apparatus 200 of the fuel cell system according to the second exemplary embodiment of the present invention are the same as those of the aforementioned exemplary embodiment, the more detailed description thereof will be omitted.

Figure 12:
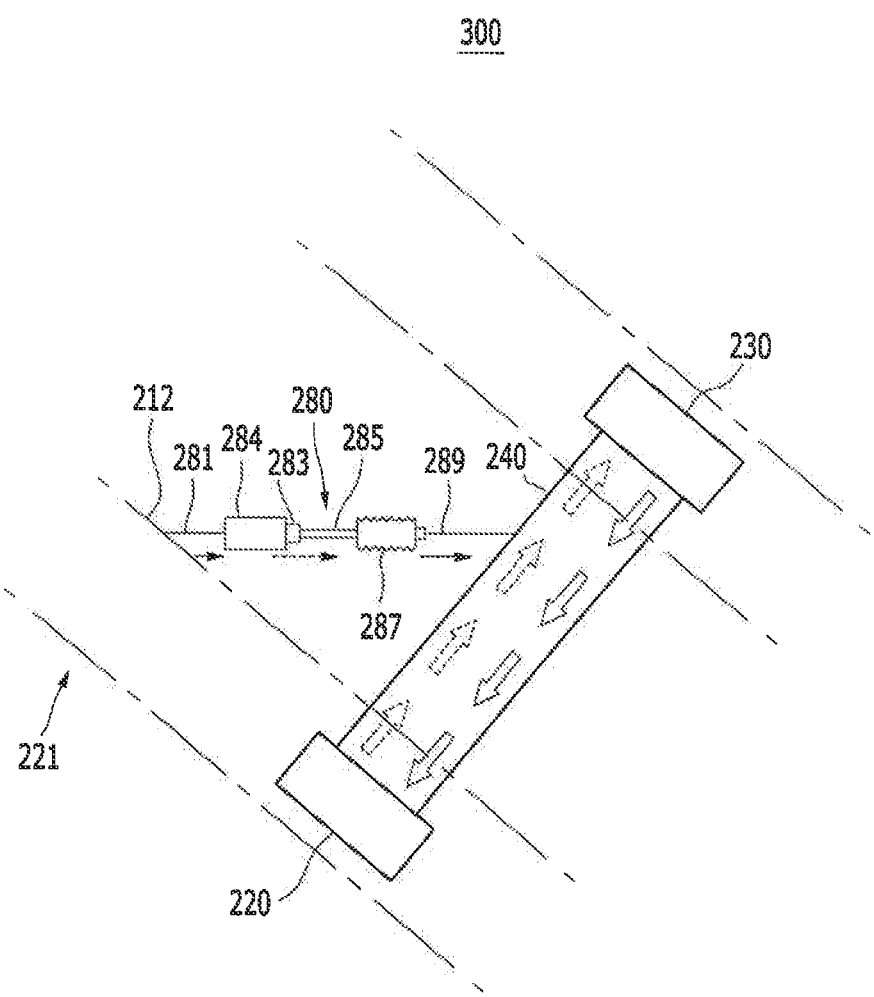
FIG. 12 is a view schematically illustrating a compressed air cooling apparatus of a fuel cell system according to a third exemplary embodiment of the present invention.

FIG. 12 is a view schematically illustrating a compressed air cooling apparatus of a fuel cell system according to a third exemplary embodiment of the present invention. Referring to FIG. 12, a compressed air cooling apparatus 300 of a fuel cell system according to a third exemplary embodiment of the present invention basically includes a heat absorber 220, a heat radiator 230, and a heat pipe 240 like the aforementioned exemplary embodiments, and may include a pressure applicator 280 for applying pressure to evaporated refrigerant gas inside the heat pipe 240 during a process of cooling the compressed air.

Because the configurations of the heat absorber 220, the heat radiator 230, and the heat pipe 240 according to the exemplary embodiment of the present invention are the same as those of the aforementioned exemplary embodiments, the more detailed description thereof will be omitted.

The pressure applicator 280 connects an air supply line 212 as a high temperature part 221 and the heat pipe 240, and may improve cooling performance of the compressed air by using pressure of the compressed air which flows through the air supply line 212 without using additional electrical control means.

The pressure applicator 280 may include an air flow path 281 connected to the air supply line 212, a cylinder member 284 connected to the air flow path 281 and having a piston 283, a connecting rod 285 connected to the piston 283 of the cylinder member 284, a bellows pipe 287 connected to the connecting rod 285, and a refrigerant gas flow path 289 for connecting the bellows pipe 287 and the heat pipe 240.

The air flow path 281 may be connected to the air supply line 212, and supplied with pressure of the compressed air. The cylinder member 284 may be connected to the air flow path 281, and move the piston 283 by pressure of the compressed air. The connecting rod 285 may then be connected to the piston 283, and may be moved together with a movement of the piston 283. The bellows pipe 287 maybe formed in a wrinkle pipe shape, and may be compressed in accordance with a movement of the connecting rod 285. The refrigerant gas flow path 289 is connected to the heat pipe 240, and refrigerant gas inside the heat pipe 240 may flow into the refrigerant gas flow path 289.

Here, the bellows pipe 287 is compressed by the connecting rod 285 in accordance with the movement of the piston 283, and may press the refrigerant gas inside the heat pipe 240 through the refrigerant gas flow path 289.

According to the compressed air cooling apparatus 300 of the fuel cell system of the third exemplary embodiment of the present invention, which configured as described above, during a process in which the compressed air, which passes through the air supply line 212, is cooled by using the heat absorber 220, the heat radiator 230, and heat pipe 240, the compressed air flows into the air flow path 281 of the pressure applicator 280. Then, the piston 283 of the cylinder member 284 is moved by pressure of the compressed air, and the connecting rod 285 is also moved. Accordingly, the bellows pipe 287 is compressed by the connecting rod 285, and presses the refrigerant gas inside the heat pipe 240 through the refrigerant gas flow path 289.

Therefore, in the exemplary embodiment of the present invention, because pressure of the compressed air is applied to the refrigerant gas evaporated inside the heat pipe 240 through the pressure applicator 280 during a process of cooling the compressed air, the movement of the refrigerant gas inside the heat pipe 240 may be activated. Accordingly, in the exemplary embodiment of the present invention, because the refrigerant gas evaporated in the heat absorber 220 more quickly reaches the heat radiator 230, circulation of the refrigerant is activated more effectively, and therefore, cooling performance of the compressed air may be more improved. That is, in the exemplary embodiment of the present invention, the circulation of the refrigerant of the heat pipe 240 is activated by using pressure of the compressed air which flows through the air supply line 212, and thereby the cooling performance of the compressed air may be improved without using additional electrical control means.

Figure 13:
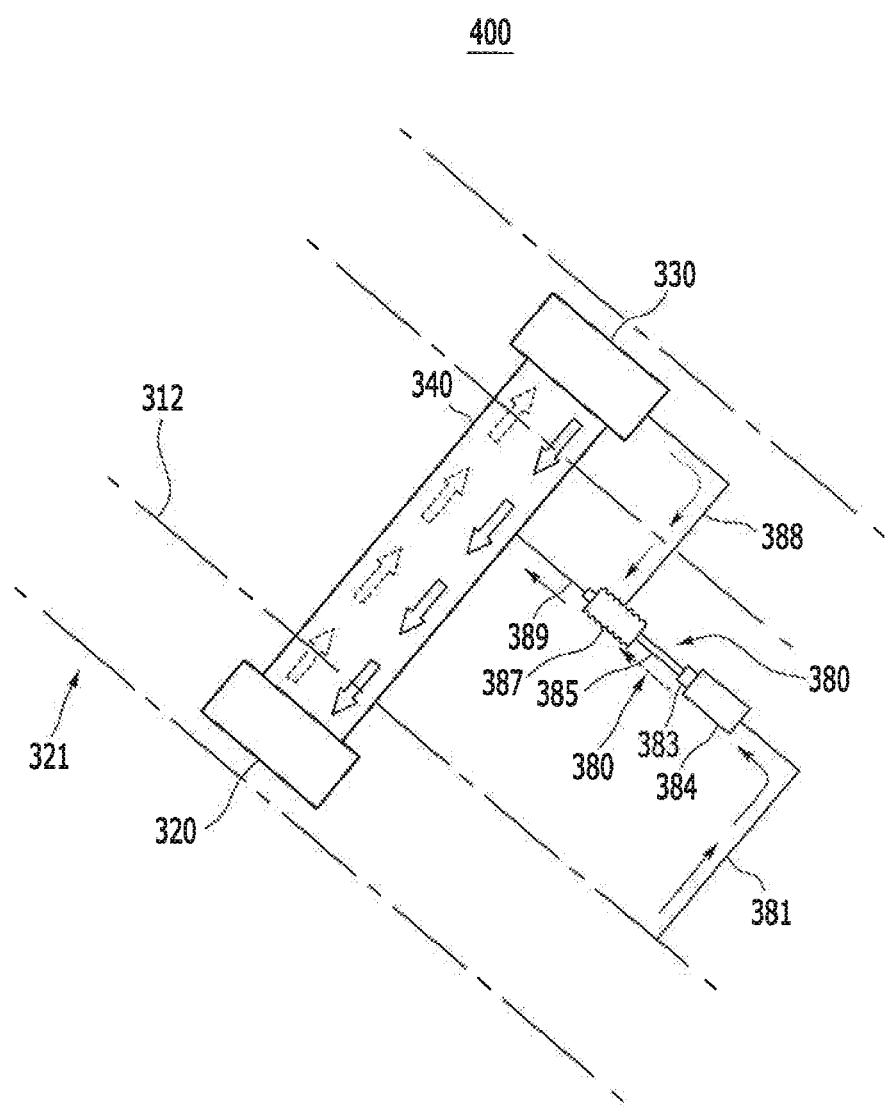
FIG. 13 is a view schematically illustrating a compressed air cooling apparatus of a fuel cell system according to a fourth exemplary embodiment of the present invention.

FIG. 13 is a view schematically illustrating a compressed air cooling apparatus of a fuel cell system according to a fourth exemplary embodiment of the present invention. Referring to FIG. 13, a compressed air cooling apparatus 400 of a fuel cell system according to a fourth exemplary embodiment of the present invention basically includes a heat absorber 320, a heat radiator 330, and a heat pipe 340 like the aforementioned exemplary embodiments, and may include a pressure applicator 380 for applying pressure to a liquid refrigerant inside the heat pipe 340 during a process of cooling the compressed air. Because the configurations of the heat absorber 320, the heat radiator 330, and the heat pipe 340 according to the exemplary embodiment of the present invention are the same as those of the aforementioned exemplary embodiments, the more detailed description thereof will be omitted.

The pressure applicator 380 connects an air supply line 312 as a high temperature part 321 to the heat radiator 330 and the heat pipe 340, and may improve cooling performance of the compressed air by using pressure of the compressed air which flows through the air supply line 312 without using additional electrical control means.

The pressure applicator 380 includes an air flow path 381 connected to the air supply line 312, a cylinder member 384 connected to the air flow path 381 and having a piston 383, a connecting rod 385 connected to the piston 383 of the cylinder member 384, a bellows pipe 387 connected to the connecting rod 385, a first refrigerant liquid flow path 388 for connecting the bellows pipe 387 and the heat radiator 330, and a second refrigerant liquid flow path 389 for connecting the bellows pipe 387 and the heat pipe 340.

The air flow path 381 is connected to the air supply line 312, and supplied with pressure of the compressed air. The cylinder member 384 is connected to the air flow path 381, and moves the piston 383 by pressure of the compressed air. The connecting rod 385 is connected to the piston 383, and may be moved together with a movement of the piston 383. The bellows pipe 387 may be formed in a wrinkle pipe shape, and may be compressed in accordance with a movement of the connecting rod 385.

Further, the first refrigerant liquid flow path 388 connects the bellows pipe 387 and the heat radiator 330, and supplies a liquid refrigerant provided from the heat radiator 330 via a gravitational force to the bellows pipe 387. The second refrigerant liquid flow path 389 connects the bellows pipe 387 and the heat pipe 340, and supplies the liquid refrigerant inside the bellows pipe 387 into the heat pipe 340.

That is, the bellows pipe 387 is supplied with the liquid refrigerant of the heat radiator 330 through the first refrigerant liquid flow path 388, and is compressed by the connecting rod 385 as the piston 383 is moved via the pressure of the compressed air, and may force the liquid refrigerant inside the heat pipe 340 by supplying the liquid refrigerant into the heat pipe 340 through the second refrigerant liquid flow path 389.

Therefore, in the exemplary embodiment of the present invention, because the liquid refrigerant is supplied into the heat pipe 340 through the pressure applicator 380 by using pressure of the compressed air thereby pressing the liquid refrigerant inside the heat pipe 340 during a process of cooling the compressed air, the movement of the liquid refrigerant inside the heat pipe 340 may be accelerated.

Accordingly, in the exemplary embodiment of the present invention, because the liquid refrigerant condensed in the heat radiator 330 more quickly reaches the heat absorber 320, circulation of the refrigerant is activated more effectively, and therefore, cooling performance of the compressed air may be more improved. That is, in the exemplary embodiment of the present invention, the circulation of the refrigerant of the heat pipe 340 is activated by using pressure of the compressed air which flows through the air supply line 312, and thereby the cooling performance of the compressed air may be improved without using additional electrical control means.

Although the operation of an exemplary embodiment of the present invention was described above by exemplifying an apparatus applied to a fuel cell system, the scope of the present invention is not construed as being limited thereto. An exemplary embodiment of the present invention may be applied to all of coolant systems of a vehicle including a coolant system for an electrical device of the vehicle.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims <Description of symbols>

1 . . . Fuel cell stack
3 . . . Fuel supplying system
5 . . . Air supplying system
7 . . . Cooling system
11 . . . Air compressor
12, 212, 312 . . . Air supply line
13 . . . Humidifier
14 . . . Compressed air inlet
15 . . . Radiator module
16 . . . Radiator
17 . . . Cooling fan
18 . . . Coolant flow path
20, 12, 220, 320 . . . Heat absorber
21, 221, 321 . . . High temperature part
25, 125 . . . Temperature sensor
30, 130, 230, 330 . . . Heat radiator
31 . . . Low temperature part
40, 140, 240, 340 . . . Heat pipe
50, 150 . . . Refrigerant reservoir
60, 160 . . . Refrigerant supplier
61, 161 . . . Refrigerant supply line
70, 170 . . . Operating means
71, 171 . . . Refrigerant pumping device
72, 172 . . . Flow path opening and closing device
90, 190 . . . Controller
101 . . . Fuel cell system
280, 380 . . . Pressure applicator
281, 381 . . . Air flow path
283, 381 . . . Piston
284, 384 . . . Cylinder member
285, 385 . . . Connecting rod
287, 387 . . . Bellows pipe
289 . . . Refrigerant gas flow path
388 . . . First refrigerant liquid flow path
389 . . . Second refrigerant liquid flow path

What is claimed is:

1. A compressed air cooling apparatus in combination with a fuel cell system, comprising:
   a heat absorber installed at a first part of an air supplying system which supplies compressed air at a high temperature compressed by an air compressor to a fuel cell stack;
   a heat radiator installed at a second part of a stack cooling system which cools a coolant circulating through the fuel cell stack of a fuel cell system; and
   a heat pipe connecting the heat absorber and the heat radiator, the heat pipe filled with the refrigerant therein,
   wherein the heat absorber is disposed at a lower position than the heat radiator such that refrigerant flows directly from the heat radiator to the heat absorber via the heat pipe.

2. The compressed air cooling apparatus in combination with a fuel cell system of claim 1, further comprising:
   a refrigerant reservoir connected to the heat radiator to store the refrigerant; and
   a refrigerant supplier which substantially connects the refrigerant reservoir and the heat absorber, and selectively supplies the refrigerant of the refrigerant reservoir to the heat absorber.

3. The compressed air cooling apparatus in combination with a fuel cell system of claim 1, wherein:
   an air supply line is the first part, the air supply line connecting the air compressor and the fuel cell stack.

4. The compressed air cooling apparatus in combination with a fuel cell system of claim 1, wherein:
   the second part is a radiator module.

5. The compressed air cooling apparatus in combination with a fuel cell system of claim 1, wherein:
   wherein the second part is a stack coolant flow path of a radiator module.

6. The compressed air cooling apparatus in combination with a fuel cell system of claim 1, wherein:
   the refrigerant supplier includes:
      a refrigerant supply line connecting the refrigerant reservoir, the heat absorber, and the heat pipe, and
      a refrigerant pumping device installed within the refrigerant supply line to pump the refrigerant therein.

7. The compressed air cooling apparatus in combination with a fuel cell system of claim 1, wherein:
   the refrigerant supplier comprises
      a refrigerant supply line connecting the refrigerant reservoir, the heat absorber, and the heat pipe, and
      an actuator operating as a flow path opening and closing device installed within the refrigerant supply line.

8. The compressed air cooling apparatus in combination with a fuel cell system of claim 7, further comprising:
   a temperature sensor configured to detect a temperature of the compressed air and output a detection signal to a controller
   wherein the controller outputs a control signal to the actuator according to a signal from the temperature sensor.

* * * * *